United States Patent [19]

Glass

[11] Patent Number: 5,086,997

[45] Date of Patent: Feb. 11, 1992

[54] STRUCTURAL JOINT AND A METHOD FOR JOINING IN REINFORCED THERMOPLASTIC FABRICATION

[75] Inventor: Billy M. Glass, Wichita, Kans.

[73] Assignee: The Boeing Company, Seattle, Wash.

[21] Appl. No.: 502,671

[22] Filed: Apr. 2, 1990

[51] Int. Cl.$^5$ ............................................. B64C 3/26
[52] U.S. Cl. ................................ 244/123; 244/131; 244/132; 403/279
[58] Field of Search ............... 244/123, 117 R, 119, 244/131, 132, 133, 123; 403/265, 267, 269, 274, 279, 280; 29/509, 513; 411/377, 503

[56] References Cited

U.S. PATENT DOCUMENTS

| | | | |
|---|---|---|---|
| 1,896,130 | 2/1933 | White | 244/132 |
| 2,343,983 | 3/1944 | Knowlton . | |
| 2,705,346 | 4/1955 | Schlaback et al. . | |
| 3,419,297 | 12/1968 | Diepenhorst et al. . | |
| 3,544,143 | 12/1970 | Ohlsson . | |
| 3,754,310 | 8/1973 | Shea . | |
| 4,120,084 | 10/1978 | Wallman | 403/274 |
| 4,478,543 | 10/1984 | Lyon . | |
| 4,478,544 | 10/1984 | Strand . | |
| 4,479,915 | 10/1984 | Tsubouchi et al. . | |
| 4,687,394 | 8/1987 | Berecz . | |
| 4,687,395 | 8/1987 | Berecz . | |
| 4,687,397 | 8/1987 | Berecz . | |
| 4,687,398 | 8/1987 | Berecz . | |
| 4,822,671 | 4/1989 | Craper et al. . | |
| 4,875,795 | 10/1989 | Anderson | 403/279 |
| 4,966,802 | 10/1990 | Hertzberg | 244/132 |

FOREIGN PATENT DOCUMENTS

| | | |
|---|---|---|
| 172176 | 8/1952 | Austria . |
| 857868 | 12/1952 | Fed. Rep. of Germany . |
| 1009617 | 11/1965 | United Kingdom . |

Primary Examiner—Galen Barefoot
Attorney, Agent, or Firm—Finnegan, Henderson, Farabow, Garrett & Dunner

[57] ABSTRACT

An aerodynamic structure comprising a skin having inner and outer opposed surfaces and a plurality of spaced, rectangular holes therethrough, each hole having a truncated triangular shape in one transverse cross-section, the truncated apex thereof being at the inner surface, and a support structure including a fiber-reinforced, thermoplastic spar in abutting relation to the inner surface, the spar including a plurality of spaced, integrally-formed, fiber-reinforced, thermoplastic tabs, each tab extending from the spar into a respective one of the holes and being shaped to fill the respective hole.

16 Claims, 4 Drawing Sheets

STRUCTURAL JOINT AND A METHOD FOR JOINING IN REINFORCED THERMOPLASTIC FABRICATION

BACKGROUND OF THE INVENTION

1. Field of Invention

The invention is directed to a structural joint for and a method of joining a reinforced thermoplastic element to another element, and, more particularly, a method of fabricating an aerodynamic structure including a reinforced thermoplastic component.

2. Description of Related Art

Carbon fiber reinforced materials are widely used as structural components, particularly in the aircraft industry. Currently, construction of wings for aircraft incorporate carbon fiber reinforced thermoplastic support structures including spars to which is secured a metal skin. Traditional rivets are used to join the skin to the spars requiring attachment to the thermoplastic spars of a metal flange for receiving the rivet.

While the use of thermoplastic support structures reduces weight without decreasing strength, the need for the metal flange for receiving rivets introduces additional unnecessary manufacturing steps and does not eliminate the traditional corrosion problems encountered at the point of riveting. Moreover, because of the different coefficients of thermal expansion of the metal flange and the thermoplastic spar, differential strains are introduced which were not present in previous all metal wings.

Efforts have been made to overcome the disadvantages of metal rivets with thermoplastic support structures by adhesively securing the skin to the structure. The adhesives, however, have less strength than is generally required.

Fiber reinforced thermoplastic rivets have been taught by Berecz in U.S. Pat. Nos. 4,687,394, 4,687,395, 4,687,397, and 4,687,398. Other plastic rivets are shown in Strand U.S. Pat. No. 4,478,544 and Lyon U.S. Pat. No. 4,478,543. All of these patents are directed to separate, preformed, cylindrical, thermoplastic rivets requiring individual insertion into coaxial bores and requiring complex structural apparatus for securing each individual rivet into position. Moreover, the rivets taught in these patents generally are not usable in modern aircraft construction because they require projecting rivet heads which are aerodynamically unacceptable.

German Patent No. 8,578,868 discloses a joint and method of forming the joint between a non-fiber reinforced plastic element and a metal element in which a tab extending from the plastic element is inserted into a truncated conical bore and heat deformed to fill the bore and secure the two elements together. The patent apparently is directed to attachment of thermoplastic electric condensor housings to metal support plates. Such a device is not subjected to the extreme forces encountered in aircraft.

All of the patents addressed above teach cylindrical rivet constructions. Cylindrical attachments do not permit selective accommodation of asymmetrical forces encountered at the attachment point. Depending upon its location and use, each attachment point in an aircraft is subjected to different shear, tension and bending forces applied in different directions. A cylindrical attachment structure is generally symmetrical and must be designed to resist the highest expected force, particularly in transverse tension and bending. This may entail an attachment structure having greater strength than necessary in one direction to resist expected forces in another direction, or use of additional attachment structures to accommodate expected forces in one direction resulting additional cost and complexity, or, in the case of design compromises, an attachment structure having insufficient strength in one direction.

The present invention is directed to a structural joint for connecting a fiber reinforced thermoplastic element to another element. The invention eliminates the need for traditional metal rivets and the associated metal flange on the thermoplastic element thereby reducing weight. The invention eliminates the need for separate attaching components such as taught in the Berecz patents. The invention contributes to efficient manufacture by permitting automated assembly of the components. The invention provides the high strength connection required for aerodynamic structures while permitting asymmetrical strength characteristics. The invention reduces or eliminates the corrosion traditionally encountered in metal fastening joints. The invention reduces the effect of differential thermal expansion. Overall, the invention significantly improves the ability to efficiently manufacture high strength structures including a fiber reinforced thermoplastic component.

Additional advantages of the invention are set forth in part in the description which follows, and in part will be obvious from the description, or may be learned by practice of the invention.

SUMMARY OF THE INVENTION

The advantages of the invention may be realized and attained by means of the instrumentalities and combinations particularly pointed out in the appended claims.

An aerodynamic structure of the invention comprises a skin having inner and outer opposed surfaces and a plurality of spaced, rectangular holes there through, each hole having a truncated triangular shape in one transverse cross section, the truncated apex thereof being at the inner surface, and a support structure including a fiber-reinforced thermoplastic spar in abutting relation to the inner surface; the spar including a plurality of spaced, integrally-formed, fiber-reinforced thermoplastic tabs, each said tab extending from the spar into a respective one of the holes and being shaped to fill the respective hole.

Preferably the reinforcing fibers in each tab are disposed in a pair of diverging paths, each being generally parallel to a respective tapering wall defining the truncated triangularly shaped cross-section of the hole.

The invention also includes a method of manufacturing an aerodynamic structure comprising the steps of forming an internal support structure including a plurality of generally parallel, fiber-reinforced, thermoplastic spars, each spar including a plurality of spaced, integrally-formed, fiber-reinforced, thermoplastic tabs extending from a surface thereof to respective distal ends, each tab having a predetermined axial length and a generally rectangular cross-section of predetermined dimensions; forming a skin having inner and outer surfaces and a pattern of apertures there through disposed to axially align with the tabs extending from the spars, each aperture having an axis generally perpendicular to the inner and outer surfaces and being defined by two pairs of opposed, generally planar walls extending between coaxial rectangular openings in the inner and outer surfaces, one pair of opposed walls tapering together from the outer surface to the inner surface, each rectangular opening in the inner surface being sized to closely receive a corresponding tab; placing the skin on the structure with the inner surface abutting the spars and the tabs axially projecting through the apertures; and applying heat and pressure to the distal ends of the tabs in sufficient amount to melt and to reform each tab to the internal shape of its respective aperture and to form a distal surface generally coplanar with the outer surface.

BRIEF DESCRIPTION OF THE DRAWINGS

The accompanying drawings, which are incorporated in and constitute a part of this specification, illustrate embodiments of the invention, and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 2:
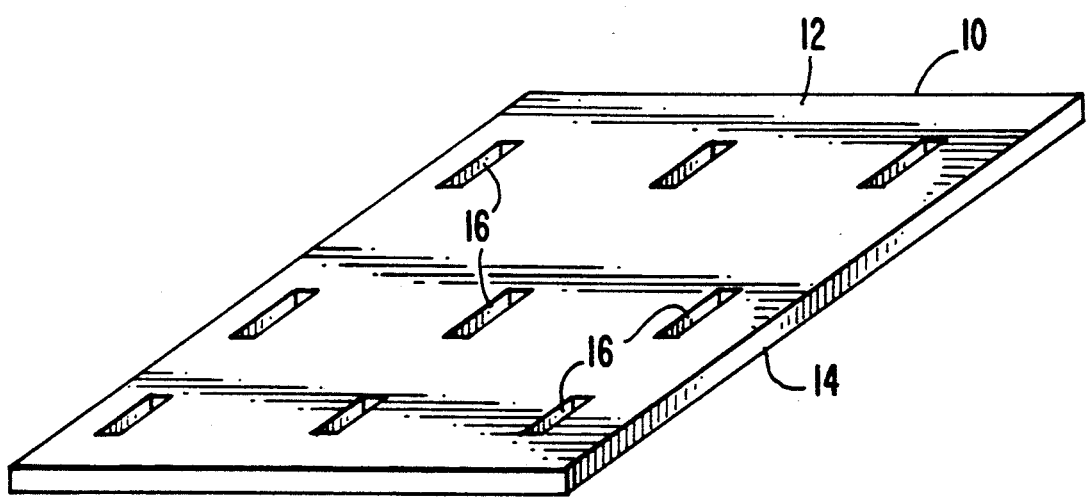
FIG. 2 is a perspective view of a skin including rectangular holes for receiving the tabs depicted in FIG. 1.
Figure 4:
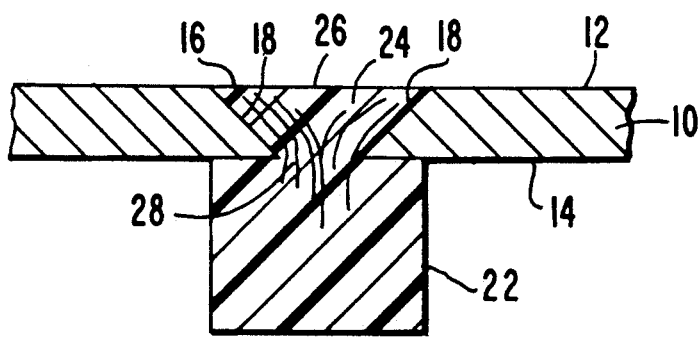
FIG. 4 is a cross-sectional view taken along lines IV—IV at FIG. 3.
Figure 5:
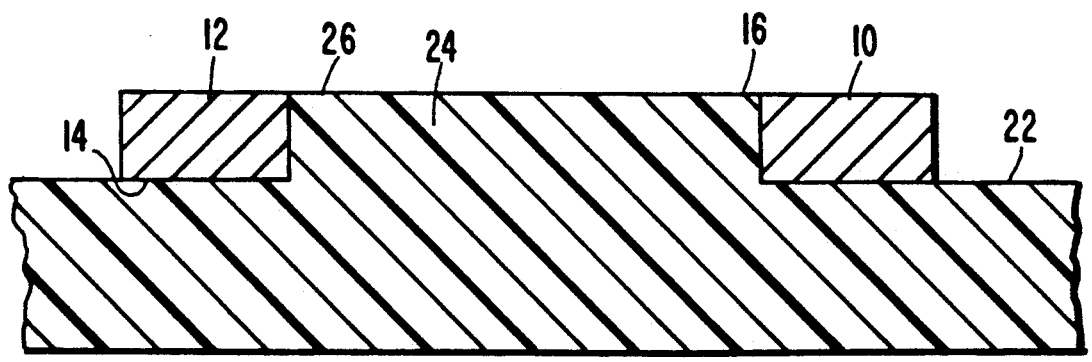
FIG. 5 is a cross-sectional view taken along lines V—V at FIG. 3.

In accordance with the invention, as embodied and broadly described herein, an aerodynamic structure comprises a skin having inner and outer opposed surfaces and a plurality of spaced, rectangular holes therethrough, each hole having a truncated triangular shape in one transverse cross-section, the truncated apex thereof being at the inner surface. As depicted in FIG. 2, skin 10 has an outer surface 12 and an inner surface 14 and a plurality of rectangular holes 16 extending through skin 10. As depicted in FIG. 4, each rectangular hole 16 in one transverse cross-section has a truncated triangular shape with the truncated apex being at inner surface 16. Preferably, holes 16 have a rectangular shape in the other transverse cross-section as depicted in FIG. 5, although other transverse cross-sectional shapes may be used.

Hole 16, also called apertures in the claims, have an axis generally perpendicular to inner and outer surfaces 12, 14 and are defined by four generally planar walls extending between rectangular openings in inner and outer surfaces 12, 14. As depicted in FIGS. 4 and 5, the width of the rectangular opening in outer surface 12 is greater than the width of rectangular opening in inner surface 14. One pair of opposed walls 18 defining aperture 16 are tapered together from outer surface 12 to inner surface 14 defining the cross-sectional truncated triangular shape.

Figure 3:
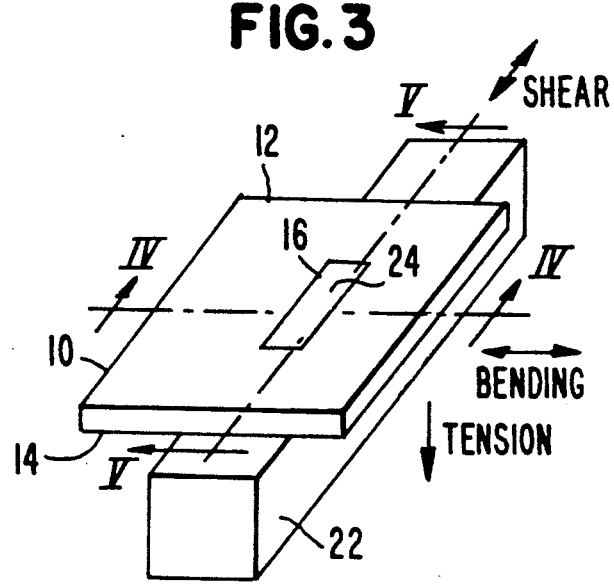
FIG. 3 is a perspective view of a spar and skin component secured together in accordance with the invention.

While FIGS. 1-5 depict openings in inner and outer surfaces 12, 14 as being rectangles having one pair of opposed sides of greater length than the other pair of opposed sides, the invention also contemplates a rectangular opening wherein the sides are of equal dimension. As depicted in FIG. 3, the structural joint may subjected to shear, bending and tension forces. These forces may be of unequal magnitude. The rectangular opening may have equal sides where the magnitude of the expected shear and bending forces is the same, or the opening may have unequal sides to provide greater strength in one direction than another to accommodate expected forces of asymmetrical magnitude. Indeed, the tabs forming part of the joint may extend from the support structure at an angle thereto to accommodate certain expected tension loads. Thus, the rectangular shape of the structural joint of the invention permits optimization of width, length and angle to carry the combination of shear, bending and tension loads.

In accordance with the invention, the aerodynamic structure further comprises a support structure including a fiber-reinforced thermoplastic spar in abutting relation to the inner surface, the spar including a plurality of spaced, integrally-formed, fiber-reinforced, thermoplastic tabs, each tab extending from the spar into a respective one of the holes and being shaped to fill the respective hole.

Figure 1:
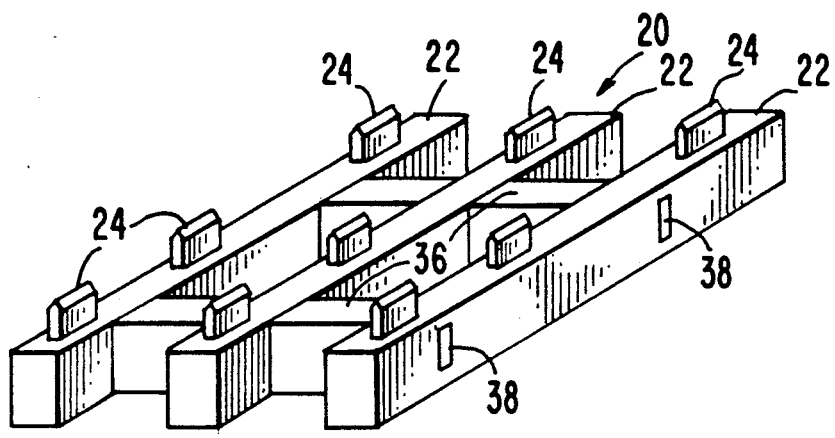
FIG. 1 is a perspective view of a support structure including fiber-reinforced thermoplastic spars incorporating integrally-formed tabs forming a part of the invention.

As depicted in FIG. 1, support structure 20 includes fiber-reinforced, thermoplastic spars 22 each including a plurality of spaced, integrally-formed, fiber-reinforced, thermoplastic tabs 24 extending from the spar. As depicted in FIG. 3, spars 22 are disposed in abutting relation to inner surface 14 of skin 12 with tab 24 extending from spar 22 into hole 16 and being shaped to fill the hole. As depicted in FIGS. 4 and 5, tabs 24 are integrally formed as one piece with spar 22. Tabs 24 are reshaped to fill hole 16 and to form a surface 26 generally coplanar with outer surface 12.

Tabs 24 include elongated reinforcing fibers 28 disposed to assume diverging paths generally parallel to tapering walls 18 on being shaped to fill hole 16. As depicted in FIG. 7a, fibers 28 and distal end 30 of tab 24 cooperate to focus the heat melting the thermoplastic to reshape tab 24 into hole 16. Distal end 30 is beveled to a point for focusing the heat to create a melt line in tab 24 which splits fibers 28 into diverging paths. Fibers 28 preferably are disposed in tabs 24 to facilitate formation of diverging fiber paths by a centrally propagating melt line. The disposition of reinforcing fibers 28 in paths generally parallel to tapered walls 18 enhances the load bearing characteristics of the joint by resisting separation of skin 12 from spar 22.

The generally V-shaped central portion of shaped tabs 24 defined by the diverging paths of fibers 28 may bear a compression load but the substantial lack of reinforcing fibers reduces its ability to bear tension loads. This construction provides an additional advantage to the joint of the invention. By proper selection of the shape and size of hole 16 and the composition and fiber construction of tabs 24, the joint will be designed to bear a predetermined load tending to separate the spar from the skin. As that load is approached or exceeded, the tension will tend to dimple the central V-shaped portion of shaped tabs 24 providing a visual indication on outer surface 12 of incipient failure.

Because fiber-reinforced thermoplastics may be reheated and reformed, an additional advantage of the invention is the ability to repair damage or injury to the joint without the necessity, as in traditional structures, of drilling out the rivet and replacing it.

The currently preferred fiber-reinforced thermoplastic for the spars and tabs may be obtained from ICI bearing the designation HTA/IM8 or from DuPont bearing the designation K3/IM6.

Figure 7C:
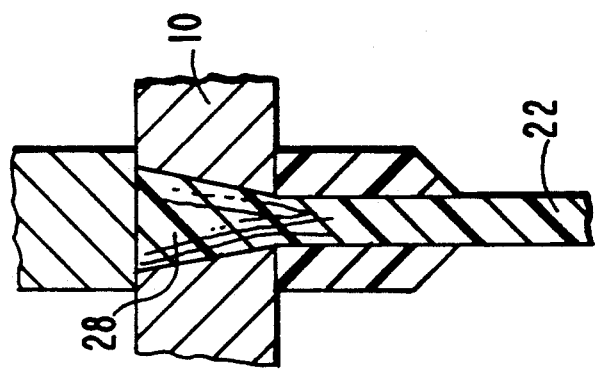
FIGS. 7a, 7b and 7c are side cross-sectional views depicting the sequential steps of reforming the thermoplastic tab to secure two components together in accordance with the invention.
Figure 7B:
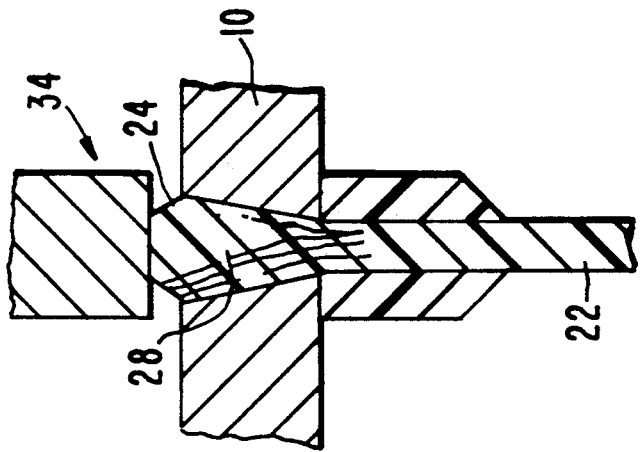
Figure 7A:
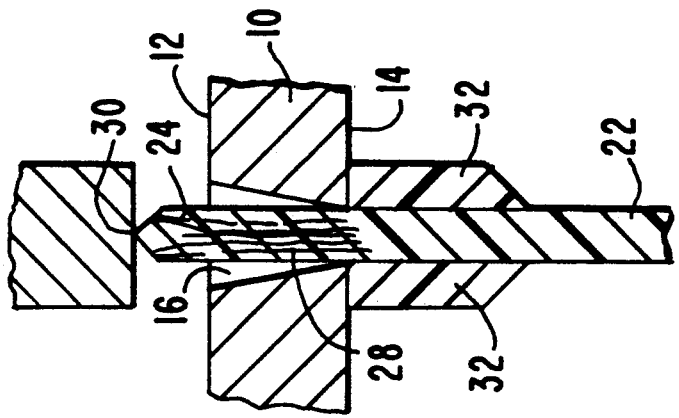

In an alternate construction depicted in FIG. 7a, 7b and 7c, spars 22 may have the same transverse dimension as tab 24, that is to closely fit the rectangular opening of holes 16 in second surface 14. In such a construction, flange elements 32 are fixed to or integrally-formed with spars 22 on both sides for disposition in abutting relation with inner surface 14 when tabs 24 are inserted into holes 16. Flange elements 32 serve to seal openings 16 at inner surface 14, serve as a stop to dimensionally control assembly by limiting the distance that tabs 24 may be inserted into hole 16, and provide a load path converting some bending load into tension. The same advantages are present in the construction depicted in FIG. 4, however in that construction the entire spar 22 has the dimensions necessary to provide the advantages. In the construction depicted in FIG. 7a, the advantages of sealing, dimension control and transferring bending load to tension is achieved without the excess material, cost and weight associated with constructing the entire spar at the same dimension.

Another advantage of the construction depicted in FIG. 4 or FIG. 7a is the reduced tolerances involved in achieving an adequate joint. Although tabs 24 have dimensions to permit close fittings in the rectangular holes in inner surface 14, the reshaping of tabs 24 serve to compensate for any errors in dimensional tolerances. Thus, the tolerances for holes and tabs in the invention may be 0.025 inches while in traditional rivet constructions, the tolerances are on the order of 0.004 inches.

Figure 6A:
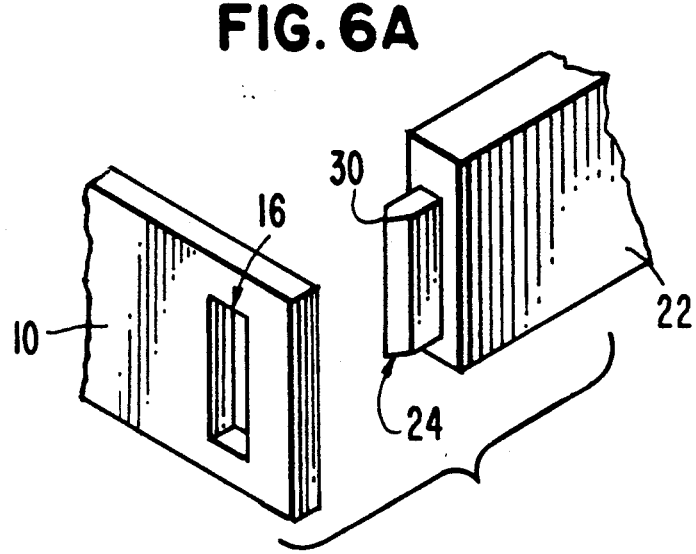
FIGS. 6a, 6b and 6c are perspective views depicting the sequential steps of assembly and attachment of two components in accordance with the invention.
Figure 6B:
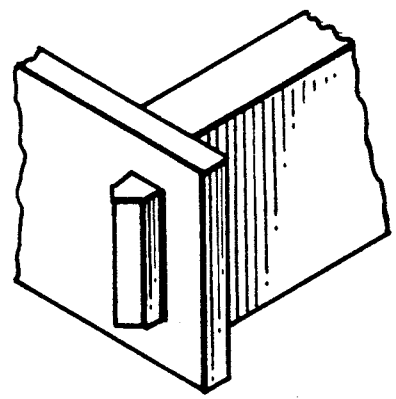
Figure 6C:
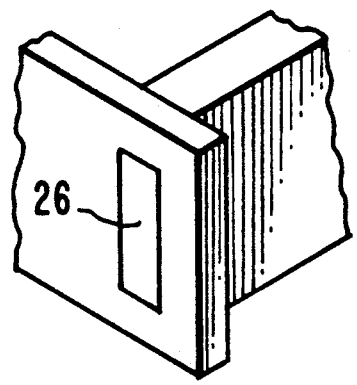

As depicted in FIGS. 6a, 6b and 6c, assembly in accordance with the invention comprises forming an aperture 16 in a first structural component or skin 12, the aperture having an axis generally perpendicular to the inner and outer surfaces of the skin 12 and being defined by a pair of opposed walls tapering together from the outer surface to the inner surface. The assembly further comprises integrally-forming with a second structural component or spar 22 an elongated, fiber-reinforced, thermoplastic tab 24 extending from the surface of spar 22 to a distal end 30, the tab having a cross-sectional size and shape corresponding to the rectangular opening in the inner surface of skin 10 and a predetermined length greater than the distance between the inner and outer surfaces. Tab 24 is then axially inserted into aperture 16 with the surface of spar 22 abutting the inner surface of skin 10, or as depicted in FIG. 7a, with flange elements 32 at abutting relation to inner surface 14 of skin 10. Finally, heat and pressure is applied to distal end 30 of tab 24 in a sufficient amount to melt and to reform tab 24 to the internal shape of aperture 16 and to form a distal surface 26 generally coplanar with outer surface 12 of skin 10.

Preferably, as depicted in FIGS. 7a, 7b and 7c, heat and pressure is applied by a heated block 34 or by ultrasonic heating. As may be seen in FIGS. 1 and 2, the invention provides the advantage of permitting automated assembly of large structural components wherein a plurality of heated blocks or ultrasonic heaters may be simultaneously placed in contact with tabs 24 projecting through apertures 16 to simultaneously reform tabs 24 and secure skin 10 to support structure 20.

Although the invention has been described in terms of securing a skin to a support structure in an aerodynamic structure, the invention may be used to secure together any two elements one of which is fiber-reinforced thermoplastic material. For example, as depicted in FIG. 1, spars 22 may be joined to crossmembers 36 using tabs 38 in the manner previously described.

It will be apparent to those skilled in the art that various modifications and variations could be made to the joint structure of the invention without departing from the scope or spirit of the invention.

What is claimed is:

1. An aerodynamic structure comprising:
   a skin having inner and outer opposed surfaces and a plurality of spaced, rectangular holes therethrough, each said hole having a truncated triangular shape in one transverse cross section, the truncated apex thereof being at said inner surface; and
   a support structure including a fiber-reinforced thermoplastic spar in abutting relation to said inner surface, said spar including a plurality of spaced, one-piece, integrally-formed, fiber-reinforced, thermoplastic tabs, each said tab extending from said spar into a respective one of said holes and being shaped to fill said respective hole and to define a surface generally co-planar with said outer surface.

2. The structure of claim 1 wherein each said hole at one of said inner and outer surfaces has one transverse dimension greater than the other transverse dimension.

3. The structure of claim 1 wherein each said hole at said inner surface has one transverse dimension greater than the other transverse dimension.

4. A structural joint for connecting a first structural component having generally parallel inner and outer surfaces to a fiber-reinforced, thermoplastic second structural component disposed in abutting relation to the inner surface of said first component, the joint comprising:
   an aperture through said first component, said aperture having an axis generally perpendicular to said inner and outer surfaces and being defined by four generally planar walls extending between coaxial, rectangular openings in said inner and outer surfaces, the width of the rectangular opening in said outer surface being greater than the width of the rectangular opening in said inner surface; and
   a fiber-reinforced, thermoplastic tab integrally-formed with and extending from said second component axially into said aperture, said tab being shaped to fill said aperture to form a surface generally coplanar with said outer surface.

5. An aerodynamic structure comprising:
   a skin having inner and outer opposed surfaces and a plurality of spaced apertures therethrough, each said aperture being defined by two pair of opposed, generally planar walls extending between rectangular openings in said inner and outer surfaces, one said pair of opposed walls tapering together from said outer surface to said inner surface;
   a support structure including a fiber-reinforced thermoplastic spar in abutting relation to said inner surface, said spar including a plurality of spaced, integrally-formed, fiber-reinforced, thermoplastic tabs, each said tab extending from said spar into a respective one of said apertures and being shaped to fill said respective aperture, the distal end of each said tab defining a surface generally coplanar with said outer surface.

6. The structure of claim 5 wherein the reinforcing fibers in each said tab are disposed in a pair of diverging paths each being generally parallel to a respective wall of said pair of tapering walls.

7. A structural joint for connecting a first structural component having generally parallel inner and outer surfaces to a fiber-reinforced, thermoplastic second structural component, said joint being formed by the process comprising the steps of:

forming an aperture in said first structural component, said aperture having an axis generally perpendicular to said inner and outer surfaces and being defined by two pairs of opposed, generally planar walls extending between coaxial rectangular openings in said inner and outer surfaces, one said pair of opposed walls tapering together from said outer surface to said inner surface;

integrally forming with said second structural component an elongated, fiber-reinforced, thermoplastic tab extending from a surface of said second structural component to a distal end, said tab having a cross-sectional size and shape generally corresponding to the rectangular opening in said inner surface and a predetermined length greater than the distance between said inner and outer surfaces;

axially inserting said tab into said aperture and abutting the surface of said second structural component to said inner surface; and applying heat and pressure to the distal end of said tab in sufficient amount to melt and to reform said tab to the internal shape of said aperture and to form a distal surface generally coplanar with said outer surface.

8. The joint of claim 7 wherein the reinforcing fibers in said tab are elongated and disposed generally parallel to the length of said tab.

9. The joint of claim 8 wherein said heat and pressure is applied to the distal end of said tab to dispose said elongated reinforcing fibers in a pair of diverging paths each being generally parallel to a respective one wall of said pair of tapering walls.

10. A method of manufacturing an aerodynamic structure comprising the steps of:

forming an internal support structure including a plurality of generally parallel, fiber-reinforced, thermoplastic spars, each said spar including a plurality of spaced, integrally-formed, fiber-reinforced, thermoplastic tabs extending from a surface thereof to respective distal ends, each said tab having a predetermined axial length and a generally rectangular cross section of predetermined dimensions;

forming a skin having inner and outer surfaces and a pattern of apertures therethrough disposed to axially align with the tabs extending from said spars, each said aperture having an axis generally perpendicular to said inner and outer surfaces and being defined by two pairs of opposed, generally planar walls extending between coaxial rectangular openings in said inner and outer surfaces, one said pair of opposed walls tapering together from said outer surface to said inner surface, each rectangular opening in said inner surface being sized to closely receive a corresponding tab;

placing said skin on said structure with said inner surface abutting said spars and said tabs axially projecting through said apertures; and applying heat and pressure to the distal ends of said tabs in sufficient amount to melt and to reform each said tab to the internal shape of its respective aperture and to form a distal surface generally coplanar with said outer surface.

11. The method of claim 10 wherein the distal end of each said tab is beveled to an edge and wherein, after said placing step, the distal ends of said tabs extend above the outer surface of said skin.

12. The method of claim 11 wherein a means for heating the tabs is pressed against the edge of each distal end thereof, said edge focusing the heat to induce melting from the center to transversely outwardly.

13. The method of claim 12 wherein the reinforcing fibers in each said tab are elongated and disposed in generally parallel relation to the axis thereof and wherein said focused heating disposes said fibers in a pair of diverging paths each being generally parallel to a respective one wall of said pair of tapering walls.

14. The method of claim 12 wherein said heating means comprises a heated block.

15. The method of claim 12 wherein said heating means comprises an ultrasonic horn.

16. A structural joint for connecting a first component having opposed inner and outer surfaces and a second component and for providing a visual indication of incipient failure, the joint comprising:

the first component having an aperture extending between coaxial, rectangular openings in the inner and outer surfaces, the aperture having a truncated triangular cross section in one transverse direction defined by opposed walls, the apex of the cross section being at the inner surface; and a fiber-reinforced thermoplastic tab joined to and axially extending from the second component through the aperture to a distal end generally coplanar with the outer surface, the tab being shaped to fill the aperture and including reinforcing fibers arranged into two diverging paths each being generally parallel to a respective one of the opposed walls, the diverging fiber paths defining a generally fiber-free thermoplastic central portion subject to visually-apparent dimpling in the distal end in response to a force in excess of a design limit tending to separate the components.

* * * * *